(12) United States Patent
Nozawa et al.

(10) Patent No.: US 6,586,854 B1
(45) Date of Patent: *Jul. 1, 2003

(54) VIBRATING APPARATUS AND SIMULATOR APPARATUS USING VIBRATING APPARATUS

(75) Inventors: Masatsugu Nozawa, Tokyo (JP); Takahiro Kawaguchi, Tokyo (JP)

(73) Assignees: Fuji Jukogyo Kabushiki Kaisha, Tokyo (JP); THK Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,044

(22) Filed: Aug. 4, 1999

(30) Foreign Application Priority Data

Aug. 10, 1998 (JP) ............................. 10-226175

(51) Int. Cl.7 ............................. H02K 7/06; H02K 7/08
(52) U.S. Cl. ............................. 310/83; 310/90
(58) Field of Search ............................. 310/80, 81, 83, 310/90

(56) References Cited

U.S. PATENT DOCUMENTS

| | | | | |
|---|---|---|---|---|
| 3,402,308 A | * | 9/1968 | Henschke | 310/80 |
| 3,548,227 A | * | 12/1970 | Woodward | 310/83 |
| 3,660,704 A | * | 5/1972 | Paine et al. | 310/80 |
| 4,398,109 A | * | 8/1983 | Kuwako et al. | 310/80 |
| 5,366,375 A | * | 11/1994 | Sarnicola | 434/37 |
| 5,391,953 A | * | 2/1995 | Veen | 310/80 |

* cited by examiner

*Primary Examiner*—Nestor Ramirez
*Assistant Examiner*—Guillermo Perez
(74) *Attorney, Agent, or Firm*—Martin A. Farber

(57) ABSTRACT

A vibrating apparatus is disclosed, in which a plurality of actuators are provided between a base table and a motion table which are installed on installation parts, each of the actuators being selectively extended and retracted to give motions to the moved portion supported on the motion table, each of the actuators including a screw shaft having a base end provided on one of the base table and the motion table through a universal joint and having a spiral groove formed on an outer periphery; and an electric motor including a rotator which has a base fixed to the other base table or motion table through a universal joint and which is hollow shaft-shaped to permit penetration of the screw shaft and has a spiral groove formed on an inner periphery, the spiral groove being screwed to the spiral groove of the screw shaft. A simulator apparatus is also disclosed, including comprising the vibrating apparatus.

4 Claims, 9 Drawing Sheets

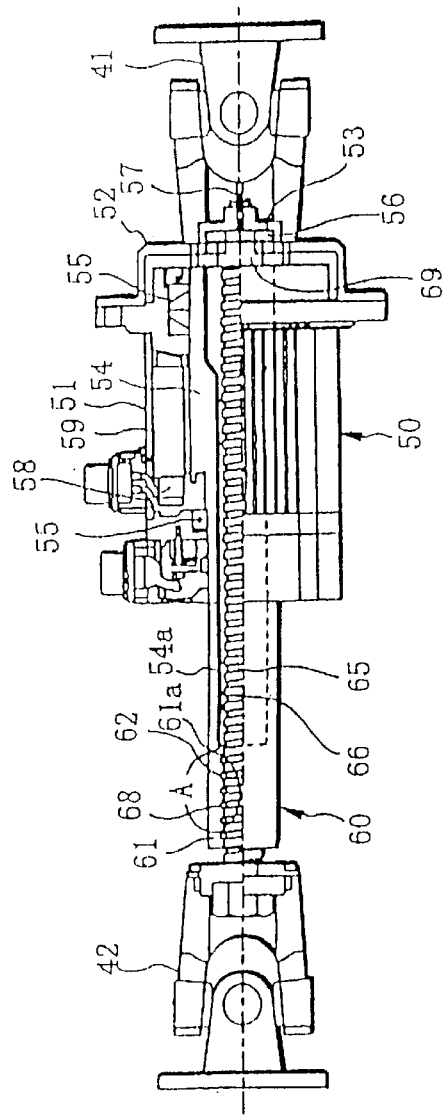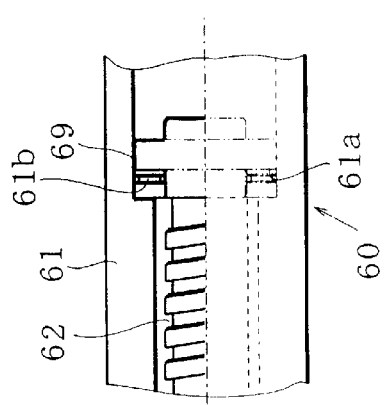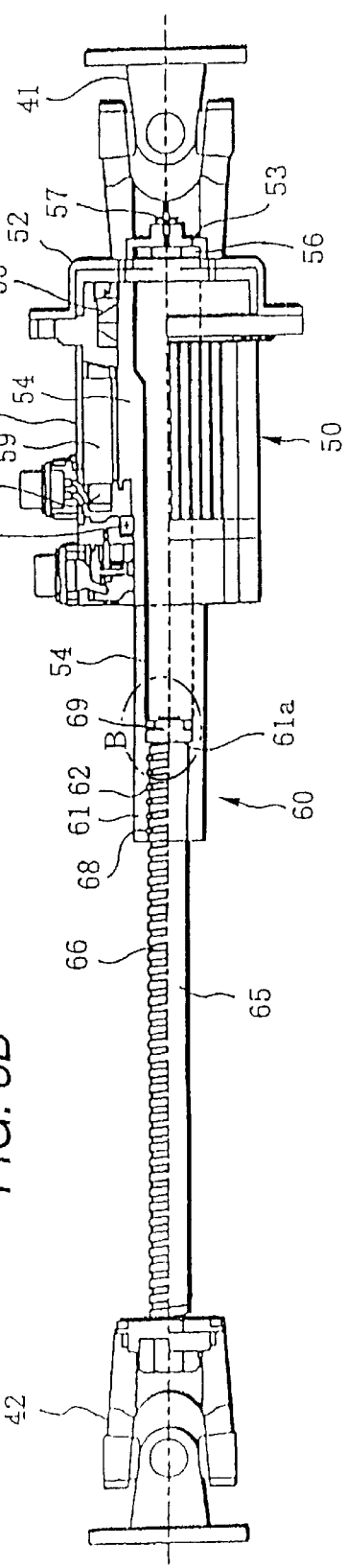
FIG. 3A
FIG. 3C
FIG. 3B

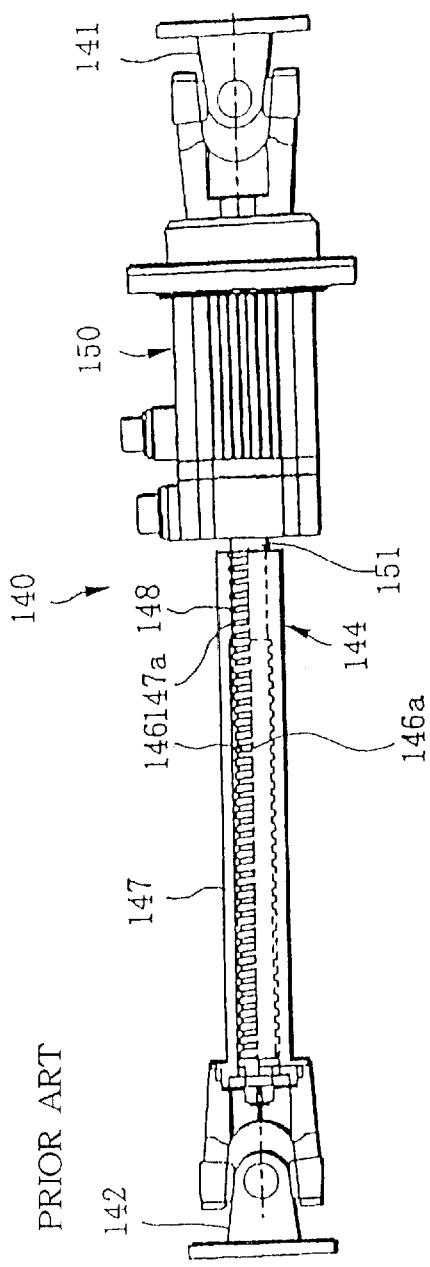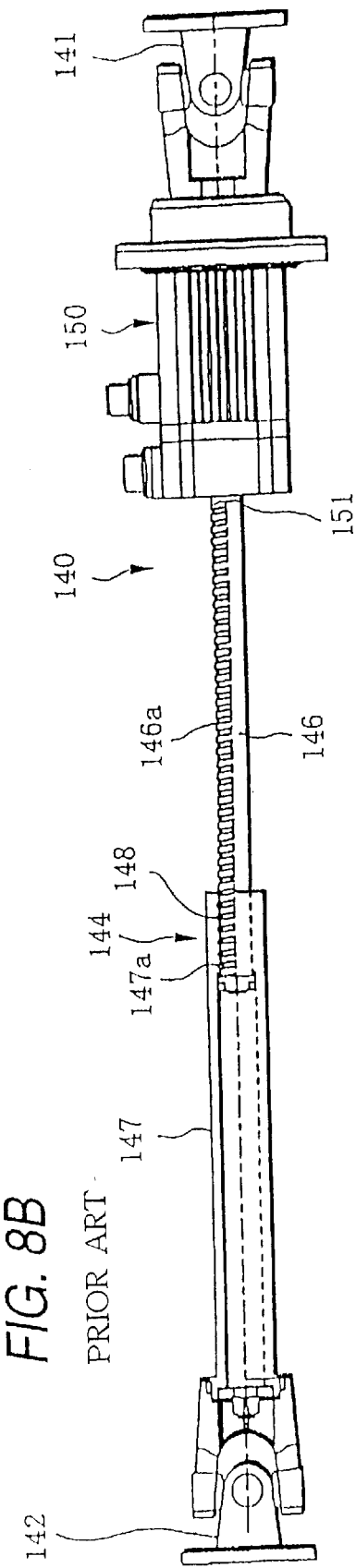
FIG. 8A PRIOR ART
FIG. 8B PRIOR ART

VIBRATING APPARATUS AND SIMULATOR APPARATUS USING VIBRATING APPARATUS

BACKGROUND OF THE INVENTION

1. Field of the Invention

The present invention relates to a vibrating apparatus and a simulator apparatus using the vibrating apparatus.

2. Description of the Related Art

A simulator apparatus, for example, a driving simulation device comprises a simulated driving room 120 inclined and moved by a motion system 130 provided on a floor plane 12 in a building 10, a display system 110 for displaying a virtual view situation and the like as schematically shown in FIG. 9.

The display system 110 includes a projector 111 installed on the upper part of the building 10 behind the simulated driving room 120, and a screen 112 for provided in the building 10 ahead of the simulated driving room 120 for projecting a picture emitted from the projector 111.

The simulated driving room 120 is formed by imitation of a real car body, for example, and includes a simulated operating device such as a seat, a steering wheel device and the like which are modeled after a real car such that a user can get on and off from a door (not shown).

The motion system 130 has a plurality of actuators 140, each of which has both ends movably supported between a base table 131 fixed to the floor plane of the building 10 and a motion table 132 supporting the simulated operating room 120, and serves to give various motions to the simulated operating room 120 fixed and supported on the motion table 132 by selectively extending or retracting each actuator 140 and to give vibrations to the simulated operating room 120 by means of a vibration generating device (not shown) provided in the simulated operating room 120.

The actuator 140 of the motion device 130 has a first universal joint 141 fixed to the base table 131 and a second universal joint 142 fixed to the motion table 132, for example, as shown in FIG. 6. An extension/retraction unit 144 is provided between the first universal joint 141 and the second universal joint 142.

The extension/retraction unit 144 is formed by a ball screw mechanism including a screw shaft 146 having a base end rotatably supported, through a bearing 145, on a casing 143 provided in the first universal joint 141, a cylindrical sleeve 147 having a base end provided in the second universal joint 142, and a ball 148 fitted between a spiral ball groove 146a formed on the outer periphery of the screw shaft 146 and a spiral ball groove 147a formed on the inner periphery of the tip of the sleeve 147.

The casing 143 provided in the first universal joint 141 installs and supports an electric motor 150 which is rotatable in normal and reverse directions and has a rotator 151 provided in parallel with the screw shaft 146, and accommodates a power transmission mechanism 155 for transmitting power from the electric motor 150 to the screw shaft 146.

The power transmission mechanism 155 comprises a driving gear 156 fixed to the rotator 151 of the electric motor 150, a driven gear 157 fixed to the base end of the screw shaft 146, and a reduction gear 158 rotatably supported on the casing 143 by means of a support device (not shown) and provided between the drive gear 156 and the driven gear 157 as shown in FIG. 6C taken along the line b—b of FIG. 6A.

By the rotation of the electric motor 150 in the normal or reverse direction, the screw shaft 146 is rotated in the normal or reverse direction with a speed reduction according to the parameters of gears through the driving gear 156, reduction gear 158 and driven gear 157 of the power transmission mechanism 155. Consequently, the sleeve 147 screwed with the ball grooves 146a and 147a and the ball 148 is moved so that the screw shaft 146 is retracted and extended in a retracted position shown in FIG. 6A and an extended position shown in FIG. 6B.

FIG. 7 shows the actuator 140 according to another aspect. Corresponding portions in FIG. 7 have the same reference numerals as those in FIG. 6 and their detailed description will be omitted. As shown in FIG. 7C taken along the line c—c of FIG. 7A, the power transmission mechanism 155 comprises a driving sprocket 159 fixed to the rotator 151 of the electric motor 150, a driven sprocket 160 fixed to the base end of the screw shaft 146, and a cog belt 161 wound between the driving sprocket 159 and the driven sprocket 160.

By the rotation of the electric motor 150 in the normal or reverse direction, the screw shaft 146 is rotated in the normal or reverse direction with a speed reduction according to the parameters of gears of the driving sprocket 159 and the driven sprocket 160 through the driving sprocket 159, the cog belt 161 and driven sprocket 160 of the power transmission mechanism 155. Consequently, the screw shaft 146 is retracted and extended in a retracted position shown in FIG. 7A and an extended position shown in FIG. 7B.

FIG. 8 shows the actuator 140 according to yet another aspect. While corresponding portions in FIG. 8 have the same reference numerals as those in FIG. 6 and their detailed description will be omitted, the actuator 140 forms the screw shaft 146 integrally with the rotator 151 of the electric motor 150, thereby removing the power transmission mechanism 151.

By the rotation of the electric motor 150 in the normal or reverse direction, the screw shaft 146 is rotated in the normal or reverse direction. Consequently, the screw shaft 146 is retracted and extended in a retracted position shown in FIG. 8A and an extended position shown in FIG. 8B.

By selectively extending or retracting the actuators 140 provided between the base table 131 and the support table 132, the motion system 130 can give various motions to the simulated driving room 120 installed and supported on the support table 132 of the simulated driving room.

In the actuator 140 shown in FIG. 6, however, the power transmission mechanism 155 comprising the driving gear 156, the reduction gear 158, the driven gear 157, the support device for supporting the reduction gear 158 on the casing 143 and the like is provided between the base end of the screw shaft 146 and the electric motor 150. Therefore, the actuator 140 has a complicated structure. In addition, the amount of movement of the sleeve 147 screwed to the screw shaft 146 by the power transmission mechanism 155 provided on the base end of the screw shaft 146 is limited so that the actuator 140 cannot be fully retracted. Furthermore, since the electric motor 150 is biased against the screw shaft 146, the tilt angle of the actuator 140 to the base table 131 is limited so that the degree of freedom of design is restricted.

As a result, the height h of the motion system 130 shown in FIG. 9 is increased so that the simulated driving room 120 is provided in a comparatively high position. In order to project a picture emitted from the projector 111 installed on the upper part of the building 10 behind the simulated driving room 120 without the influence of the simulated driving room 120 on the screen 112 provided on the simulated driving room 120, therefore, it is necessary to place the projector 111 in a high position. Consequently, the size of the building 10 is increased.

In order to avoid the influence of the simulated driving room 120 by reducing the size of the building 10 and placing the projector 111 in a comparatively low position, there has been a method for moving upward the lower end of the screen 112 on which a picture is projected, thereby reducing the size of the screen 112. However, the size of the picture such as a road, a circumferential landscape and the like which are projected on the screen 112 during virtual running, in particular, a vertical range is limited. Consequently, it is hard to sufficiently give virtual reality to a user in the simulated driving room 120.

Moreover, the amount of retraction of the actuator 140 is limited. Therefore, the simulated driving room 120 is placed in a comparatively high position when the simulated driving room 120 is lowered to the lowest position. Consequently, there is a possibility that the user might be prevented from getting on and off the simulated driving room 120.

Also in the actuator 140 shown in FIG. 7, the power transmission mechanism 155 comprising the driving sprocket 159, the driven sprocket 160, the cog belt 161 and the like is provided between the base end of the screw shaft 146 and the electric motor 150. Therefore, the actuator 140 has a complicated structure. The amount of movement of the sleeve 147 screwed to the screw shaft 146 by the power transmission mechanism 155 provided on the base end of the screw shaft 146 is limited so that the actuator 140 cannot be fully retracted. Furthermore, since the electric motor 150 is biased against the screw shaft 146, the tilt angle of the actuator 140 to the base table 131 is limited so that the degree of freedom of design is restricted. As a result, there are the same drawbacks as in the actuator 140 shown in FIG. 6.

According to the actuator 140 shown in FIG. 8, the rotator of the electric motor 150 and the screw shaft 146 are formed integrally. Therefore, the power transmission mechanism 155 is removed so that the structure can be simplified. In addition, the restriction on the tilt angle of the actuator 140 to the base table 131 can be relieved.

However, the electric motor 150 is provided between the screw shaft 146 and the first universal joint 141 and the amount of movement of the sleeve 147 screwed to the screw shaft 146 is restricted by the electric motor 150. Consequently, the actuator 140 cannot be fully retracted. Thus, there are the same drawbacks as in the actuators of FIGS. 6 and 7.

SUMMARY OF THE INVENTION

In consideration of the above-mentioned respect, accordingly, it is an object of the present invention to provide a vibrating apparatus capable of fully retracting an actuator to control a height between a base table and a motion table, and a simulator apparatus using the vibrating apparatus.

In order to achieve the above-mentioned object, the present invention provides a vibrating apparatus according to a first aspect of the invention, in which a plurality of actuators are provided between a base table and a motion table which are installed on installation parts, each of the actuators being selectively extended and retracted to give motions to the moved portion supported on the motion table, each of the actuators comprising a screw shaft having a base end provided on one of the base table and the motion table through a universal joint and having a spiral groove formed on an outer periphery, and an electric motor including a rotator which has a base fixed to the other base table or motion table through a universal joint and which is hollow shaft-shaped to permit penetration of the screw shaft and has a spiral groove formed on an inner periphery, the spiral groove being screwed to the spiral groove of the screw shaft.

According to the first aspect of the invention, each actuator provided between the base table and the motion table is formed by the screw shaft having the base end provided on one of the base table and the motion table through the universal joint, and the electric motor including the rotator having the base fixed to the other base table or motion table through the universal joint and taking the shape of a hollow shaft for permitting the penetration of the screw shaft and screwed to the screw shaft. Therefore, the screw shaft is caused to penetrate the rotator of the electric motor in the retraction state. Consequently, the height between the base table and the motion table can be reduced while keeping a motion range.

In the vibrating apparatus according to the first aspect of the invention, the spiral grooves formed on the outer periphery of the screw shaft and the inner periphery of the rotator are spiral ball grooves which are screwed through balls fitted in respective grooves.

According to the invention of this embodiment, the screw shaft is coupled to the rotator by means of the so-called ball screw mechanism in which the spiral grooves formed on the outer periphery of the screw shaft and on the inner periphery of the rotator are spiral ball grooves to be screwed through a ball. Consequently, the relative movement of the screw shaft and the rotator can be performed smoothly. Thus, the vibrating apparatus can be smoothly operated.

In the vibrating apparatus according to the first aspect of the invention, the electric motor is fixed to the base table through the universal joint, and the screw shaft is fixed to the motion table through the universal joint.

According to the invention of this embodiment, the electric motor having a comparatively great mass is provided on the base table through the universal joint. Consequently, the motion range of the electric motor is controlled so that the influence on the operation of the vibrating apparatus caused by the motion of the electric motor can be relieved.

In order to achieve the above-mentioned object, the present invention provides a simulator apparatus using the vibrating apparatus according to a second aspect of the invention, comprising a vibrating apparatus in which a plurality of actuators are provided between a base table provided on a floor plane of a building and a motion table supporting a moved portion, each of the actuators is selectively extended and retracted to give motions to the moved portion supported on the motion table, and a display system having s projector opposed to the vibrating apparatus apart therefrom, and a screen for projecting a picture emitted from the projectors, each of the actuators including a screw shaft having a base end provided on one of the base table and the motion table through a universal joint and having a spiral groove formed on an outer periphery, and an electric motor including a rotator which has a base fixed to the other base table or motion table through a universal joint and which is hollow shaft-shaped to permit penetration of the screw shaft and has a spiral groove formed on an inner periphery, the spiral groove being screwed to the spiral groove of the screw shaft.

According to the invention of the second aspect of the invention, the height between the base table of the vibrating apparatus and the motion table can be reduced in the same manner as in the first aspect of the invention, and the height of the moved portion supported on the motion table can be controlled. Thus, projection from the projector to the screen can be easily performed without increasing the size of the building.

In the simulator apparatus using the vibrating apparatus according to the second aspect of the invention, the moved portion is a simulated driving room where a user can get on and off.

According to the invention of this embodiment, in the case where the moved portion is the simulated driving room where the user can get on and off, the simulated driving room is provided in a lower position so that the user can easily get on and off the simulated driving room.

In the simulator apparatus using the vibrating apparatus according to the second aspect of the invention, the projector is provided above the moved portion.

According to the invention of this embodiment, since the moved portion is provided in a comparatively low position, the range of projection from the projector to the screen can be enlarged so that a virtual reality can be given to the user of the simulator apparatus. In addition, the vertical position of the projector can be set comparatively low so that the height of the building can be controlled, thereby reducing the size of the building.

BRIEF DESCRIPTION OF THE DRAWINGS

FIG. 3 is a view illustrating an actuator, FIG. 3A being a sectional view showing a main part in a retracted state, FIG. 3B being a sectional view showing a main part in an extended state; and FIG. 3C a sectional view of a main part when a heavy load is absorbed;

FIG. 8 is a view illustrating the actuator according to the related art, FIG. 8A being a sectional view of the main part in the retracted state, and FIG. 8B being a sectional view of the main part in the extended state.

DESCRIPTION OF THE PREFERRED EMBODIMENTS (First Embodiment)

A first embodiment of a vibrating apparatus and a simulator apparatus using the vibrating apparatus will be described below by taking a driving simulator apparatus as an example.

Figure 9:
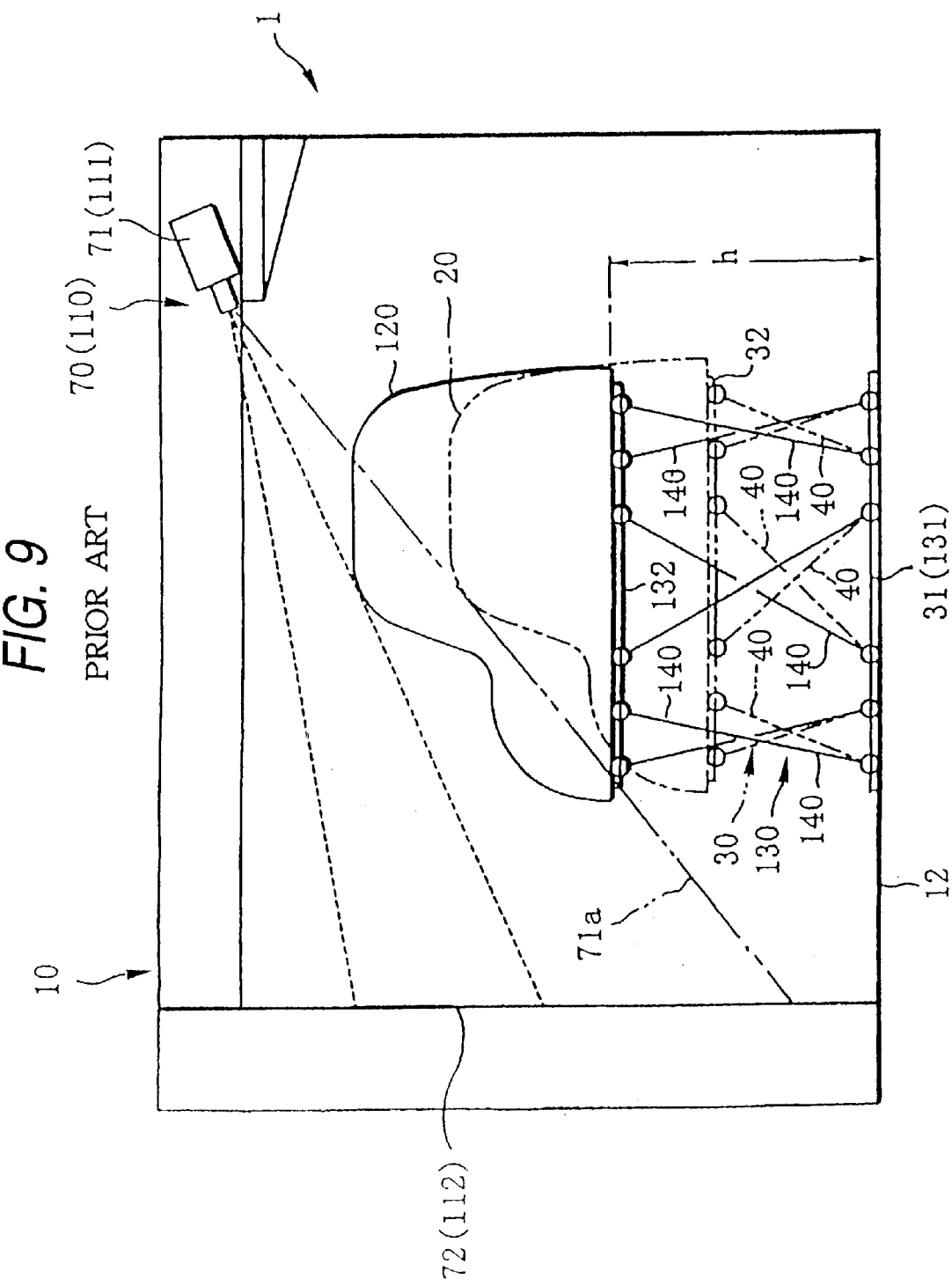
FIG. 9 is a view schematically illustrating a driving simulator apparatus.

A driving simulator apparatus 1 comprises a simulated driving room 20 acting as a moved portion which is provided on a floor plane 12 of a building 10 as an installing part for being inclined and moved by a vibrating apparatus 30, a display system 70 for displaying a virtual view situation sent from the simulated driving room 20 and the like as schematically shown in a two-dot chain line of FIG. 9.

The simulated driving room 20 is formed by imitation of a real car body, for example, and includes a simulated operating device such as a seat, a steering wheel device and the like which are modeled after a real car such that a user can get on and off by opening and closing a door (not shown).

Figure 1:
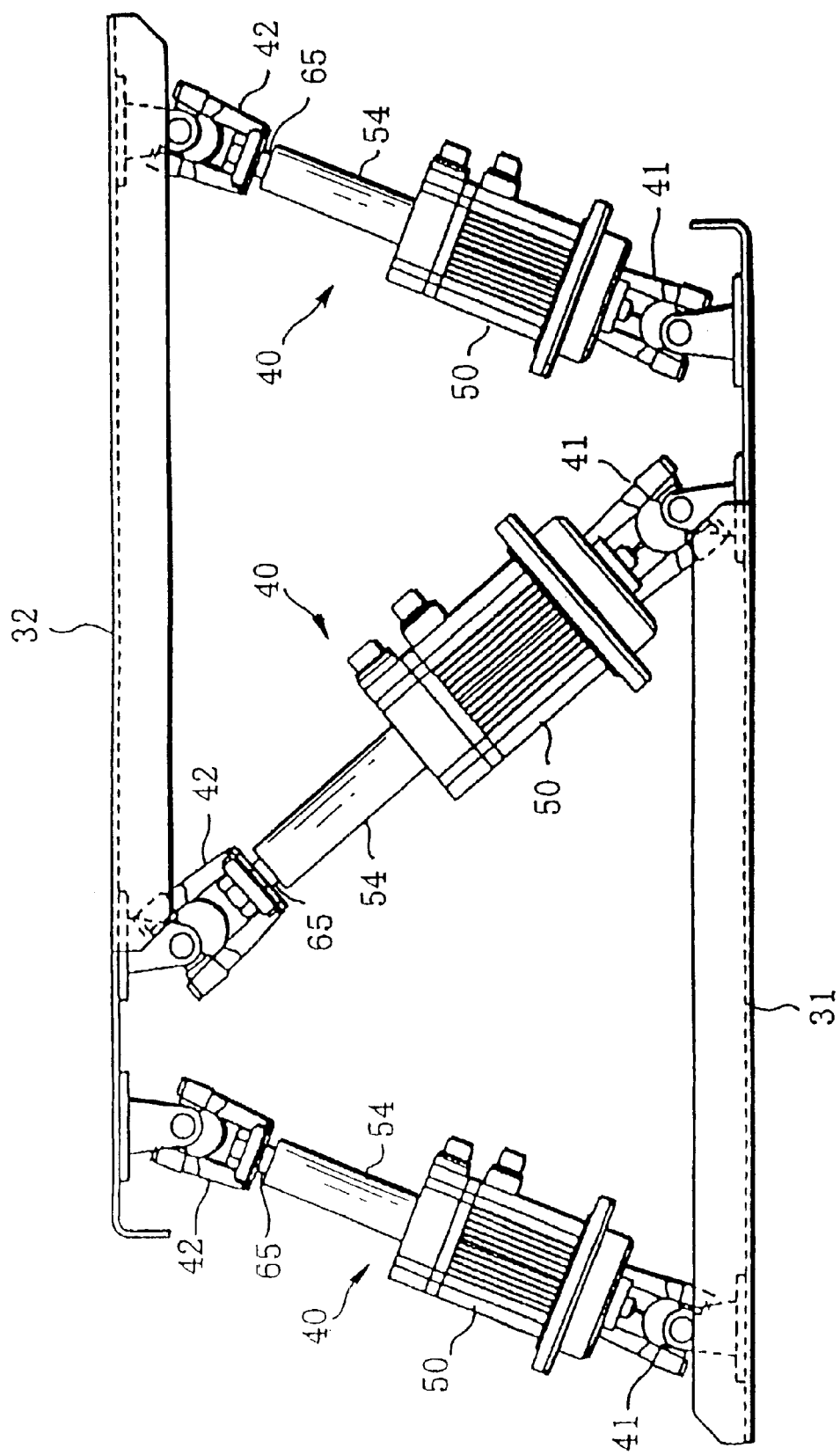
FIG. 1 is a side view of a vibrating apparatus illustrating a first embodiment of the vibrating apparatus and a simulator apparatus using the vibrating apparatus according to the present invention.

As shown in FIG. 1, the motion system 30 has a plurality of actuators 40, each of which has both ends movably supported between a pair of base tables 31 (only one of them is shown) fixed to the floor plane of the building 10 and provided in parallel with each other, and a motion table 32 supporting the simulated operating room 20, and serves to give various motions to the simulated operating room 20 fixed and supported on the motion table 32 by selectively and repetitively extending or retracting each actuator 40 and to give vibrations to the simulated operating room 20 by means of a vibration generating device (not shown) provided in the simulated operating room 20.

Figure 2:
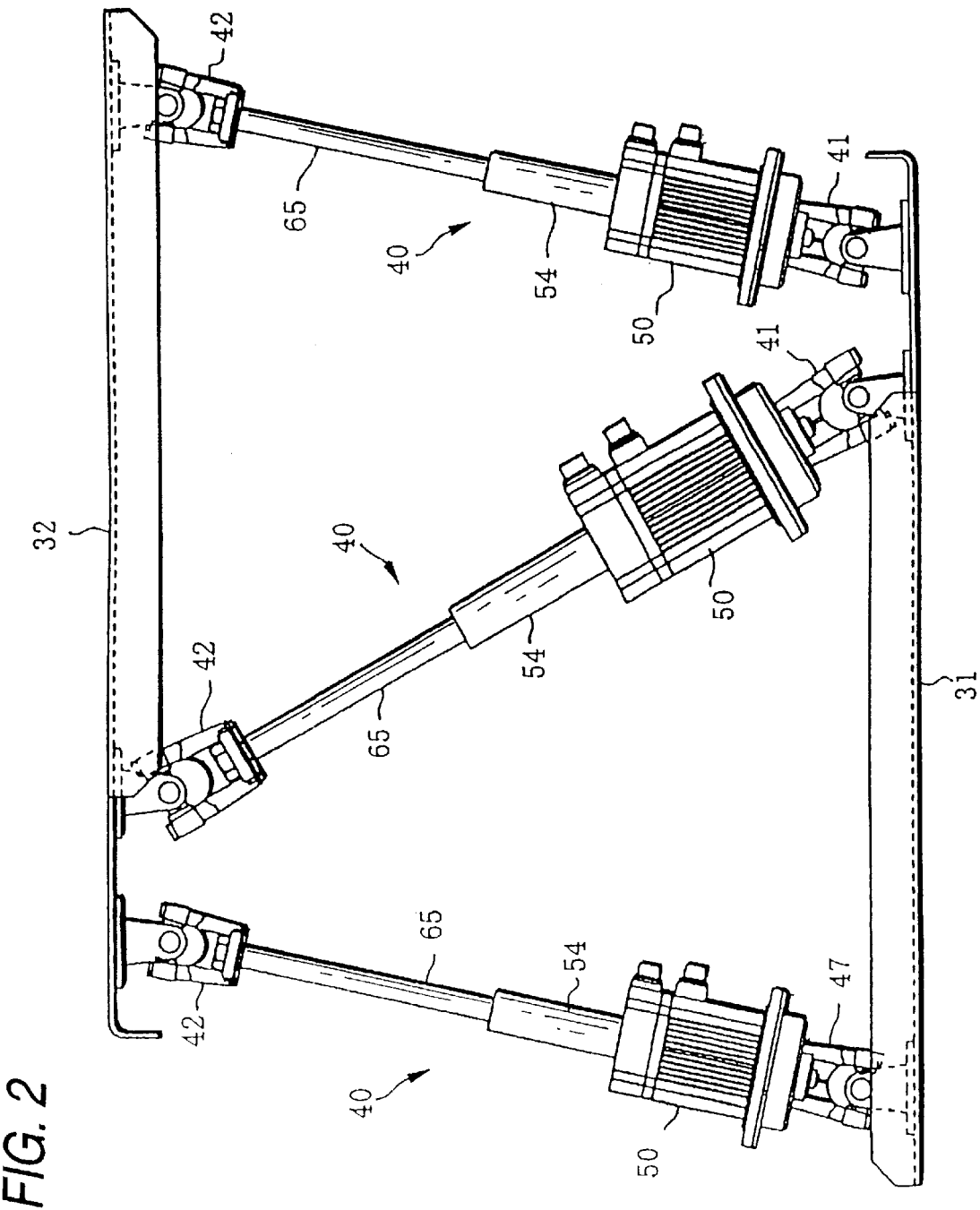
FIG. 2 is a side view of the vibrating apparatus.

The actuator 40 of the electric motion device 30 has a first universal joint 41 fixed to the base table 31 and a second universal joint 42 fixed to the motion table 32, for example, as shown in FIG. 1. As shown in FIG. 1, each actuator 40 is selectively extended and retracted to move the motion table 32 according to an instruction sent from a controller based on virtual running characteristic data following the inclination of a body caused by the running of al real car between the lowest position where the actuator 40 is retracted to bring the motion table 32 downward as shown in FIG. 1 and the highest position where the actuator 40 is extended to bring the motion table 32 upward as shown in FIG. 2. Consequently, motions can be given to the simulated driving room 20 provided on the motion table 32.

As shown in FIG. 3, the actuator 40 has a first universal joint 41 fixed to the base table 31 and a second universal joint 42 fixed to the motion table 32, and the first universal joint 41 is provided with an electric motor 50.

The electric motor 50 has an end cover 52 of a cylindrical base 51 fixed to the first universal joint 41, and is a so-called hollow motor in which a hollow shaft-shaped rotator 54 for permitting the penetration of a screw shaft 65 which will be described below is rotatably supported on a base 51 by means of a bearing 55. One of ends of the rotator 54 projects from the base 51, and a cylindrical recess 53 in which a stopper 69 to be described below can be fitted is formed opposite to the end of the rotator 54 coaxially with the rotator 54 on the end cover 52 provided opposite to the other end of the rotator 54.

A disk-like damper 56 is fitted in the recess 53. The damper 56 is made of an elastic member, for example, rubber and has a hole formed in the central portion thereof. In addition, a limit switch 57 is provided in the central portion of the recess 53. The reference numeral 58 denotes a stator coil, and the reference numeral 59 denotes a stator core.

Figure 4:
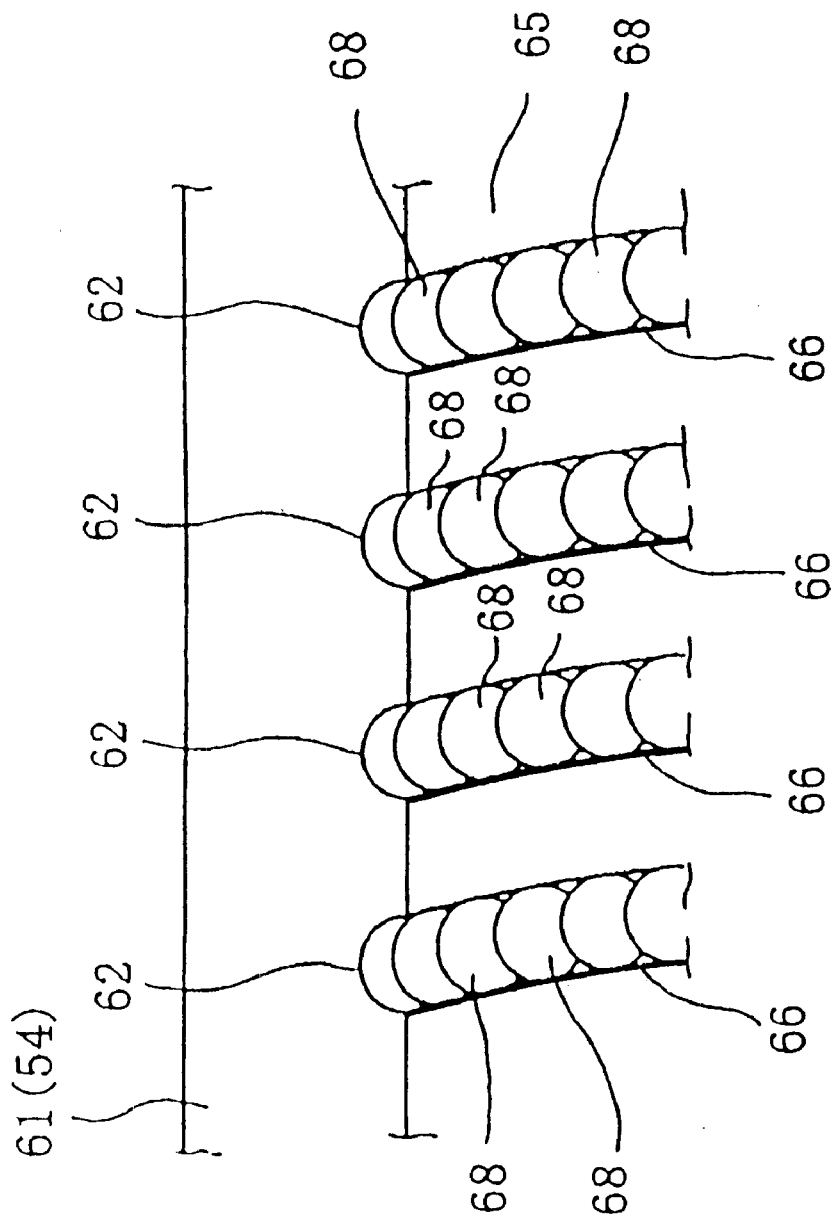
FIG. 4 is an enlarged view showing a portion of FIG. 3A.

A reduced diameter part 61 having an inside diameter reduced is formed on the tip of the rotator 54 projecting from the base 51, and a spiral ball groove 62 is formed on the inner peripheral face of the reduced diameter part 61 as shown in FIG. 4 in which a of FIG. 3A is enlarged.

On the other hand, the base end of a screw shaft 65 having a spiral ball groove 66 formed on the outer periphery is coupled to the second universal joint 42. An extension/retraction unit 60 is formed by a ball screw mechanism to be screwed through a ball 68 fitted between the ball groove 66 and the spiral ball groove 62 formed on the inner periphery of the reduced diameter part 61.

More specifically, a ball-return path (not shown) connected to the ball groove 62 is formed in the reduced diameter part 61. The endless circuit of the ball 68 is formed by the ball groove 62 and the ball-return path, and a large number of balls 68 are arranged and housed in the endless circuit. With such a structure, each ball 68 is rolled and circulated over the ball groove 62 of the screw shaft 65 while receiving a load with the rotation of the rotator 54. Furthermore, a stopper 69 is provided on the tip of the screw shaft 65. The stopper 69 slides over the inner peripheral face 54a of the rotator 54, can abut against a terminal portion 61a of the reduced diameter part 61 and can be fitted in the recess 53 formed on the end cover 52. As shown in FIG. 3C, a thrust bearing 61b can be provided between the ball groove 62 and the terminal portion 61a for relieving a load applied to the stopper 69 during actuation. And further, a thrust bearing 61b can be inserted between the ball groove 62 and the end surface 61a as shown in FIG. 3C for absorbing the heavy load to the stopper 69 when actuating the actuator 40.

By the rotation of the rotator 54 of the electric motor 50 in the normal or reverse direction, the rotator 54 has a structure in which the screw shaft 65 is smoothly retracted and extended in the retracted state shown in FIG. 3A and the extended state shown in FIG. 3B by the ball screw mechanism formed by the ball 68 fitted between the spiral ball groove 62 formed on the rotator 54 and spiral ball groove 66 formed on the screw shaft 65.

When the actuator 40 for motion is retracted to a retracted end position as shown in FIG. 3A, the stopper 69 provided on the tip of the screw shaft 65 abuts against the damper 56 fitted in the recess 53 so that the retracted end is controlled and a limit switch 57 is operated.

On the other hand, when the actuator 40 for motion is extended to a extended end position, the stopper 69 provided on the tip of the screw shaft 65 abuts against the terminal portion 61a of the reduced diameter part 61 so that the extended end is controlled.

According to the vibrating apparatus 30 having such a structure, the tip of the screw shaft 65 is moved in the rotator 54 in the retracted state so that the stopper 69 provided on the tip of the screw shaft 65 penetrates the rotator 54 to reach the inside of the recess 53 formed on a side plate 52. Consequently, the amount of movement of the screw shaft 65 can be fully kept. Furthermore, since the electric motor 50 is provided coaxially with the screw shaft 65, the tilt range of the actuator 40 for motion with respect to the base table 31 can surely be increased.

Moreover, the electric motor 50 is provided on the first universal joint side 41 fixed to the floor plane 12. As compared with the case where the electric motor 50 is provided on the side of the second universal joint 42 mounted on the motion table, consequently, the range of movement of the electric motor 50 can be reduced as much as possible, the motion of the motion table 32 is less influenced by the mass of the electric motor 50, and the quick motion of the motion table 32 can be kept.

The display system 70 comprises a projector 71 fixed to the upper portion of the building 10 behind the simulated driving room 20, and a screen 72 provided in the building 10 ahead of the simulated driving room 20 for projection a picture emitted from the projector 71.

Next, the action of the driving simulator apparatus 1 having such a structure will be described below.

Prior to the use of the driving simulator apparatus 1, each actuator 40 for motion of the vibrating apparatus 30 is retracted to drop the motion table 32 up to the lowest position shown in FIG. 1, thereby causing the simulated driving room 20 to stand by in a getting on and off position.

The retraction of the actuator 40 is performed as follows. By the rotation of the rotator 54 of the electric motor 50 provided on the actuator 40 in the normal or reverse direction, the rotator 54 is brought into the retracted state shown in FIG. 3A by the ball screw mechanism formed by the ball 68 fitted between the spiral ball groove 62 formed on the rotator 54 and the spiral ball groove 66 formed on the screw shaft 65. Consequently, the stopper 69 provided on the tip of the screw shaft 65 abuts against the damper 56 fitted in the recess 53 and is thereby controlled at the retracted end. In addition, the action of the limit switch 57 causes the electric motor 50 to be stopped.

A user gets in the simulated driving room 20 which thus goes downward to the lower position acting as the getting on and off position and stands by.

After the user gets in the simulated driving room 20, a virtual view such as a road, a peripheral landscape and the like which are obtained during virtual running are projected as the forward view of the user sitting on the seat of the simulated driving room 20 from the projector 71 of the display system 70 to the screen 72 according to an instruction sent from the controller which is based on virtual view state data and the like in response to a signal by an operator's starting operation in an operation room (not shown).

The user sitting on the seat manipulates a steering wheel or the like which is provided in the simulated driving room 20 while visually observing the forward virtual view state projected on the screen 72.

At the same time, the rotation of the electric motor 50 of the actuator 40 for motion in the normal and reverse directions is selectively controlled according to the instruction of the controller based on virtual body running characteristic data such as inclinations and vibrations of the body and the like, thereby repeating the extension and retraction of the actuator 40. Consequently, the motion table 32 is moved between the lowest position and the highest position shown in FIG. 1 and the simulated driving room 20 is moved in various directions. In addition, the vibration is applied to the simulated driving room 20 by means of the vibration generating device provided in the simulated driving room 20.

Accordingly, the virtual view situations such as the road, the circumferential landscape and the like which are obtained during the virtual running are projected on the screen 72 provided ahead of the simulated driving room 20, and the motion is given to the simulated driving room 20 with the range of movement fully kept. Consequently, such a virtual reality as to get on and drive a real car is given to the user getting in the simulated driving room 20.

Then, the actuator 40 for motion is retracted by the electric motor 50 of the actuator 40 for motion according to the instruction sent from the controller, thereby bringing the motion table 32 downward to the lowest position shown in FIG. 1. Thus, the retraction of the actuator 40 for motion and the vibration generating device are stopped. Thereafter, the user getting in the simulated driving room 20 gets off the simulated driving room 20.

According to the first embodiment having such a structure, the lowest position shown in FIG. 1 where the motion table 32 is brought downward and the highest position shown in FIG. 2 where the motion table 32 is brought upward can be set to lower positions than in the related art.

Accordingly, the simulated driving room 20 is provided in a comparatively low position. The building 10 having a comparative small size can largely project a picture emitted from the projector 71 fixed to the upper part of the building 10 behind the simulated driving room 20 on the screen 72 without the influence of the simulated driving room 20 as the lower edge of the range of projection shown in a two-dot chain line 71a of FIG. 9. Consequently, the sufficient virtual reality can be given to the user getting in the simulated driving room 20. In addition, the simulated driving room 20 is placed in a comparatively low position when the simulated driving room 20 is brought downward to the lowest position, that is, the getting on and off position. Therefore, the user can well get on and off the simulated driving room 20.

(Second Embodiment)

Referring to FIG. 5, a second embodiment of the present invention will be described below. In FIG. 5, corresponding portions in FIG. 5 have the same reference numerals as those in FIG. 3, and their description will be omitted and different portions will be described below.

In the present embodiment, the rotator 54 of the electric motor 50 according to the first embodiment is divided into a rotator body 81 and a sleeve 85 which can be assembled. Consequently, the size of each component is reduced so that workability can be enhanced.

Figure 5A:
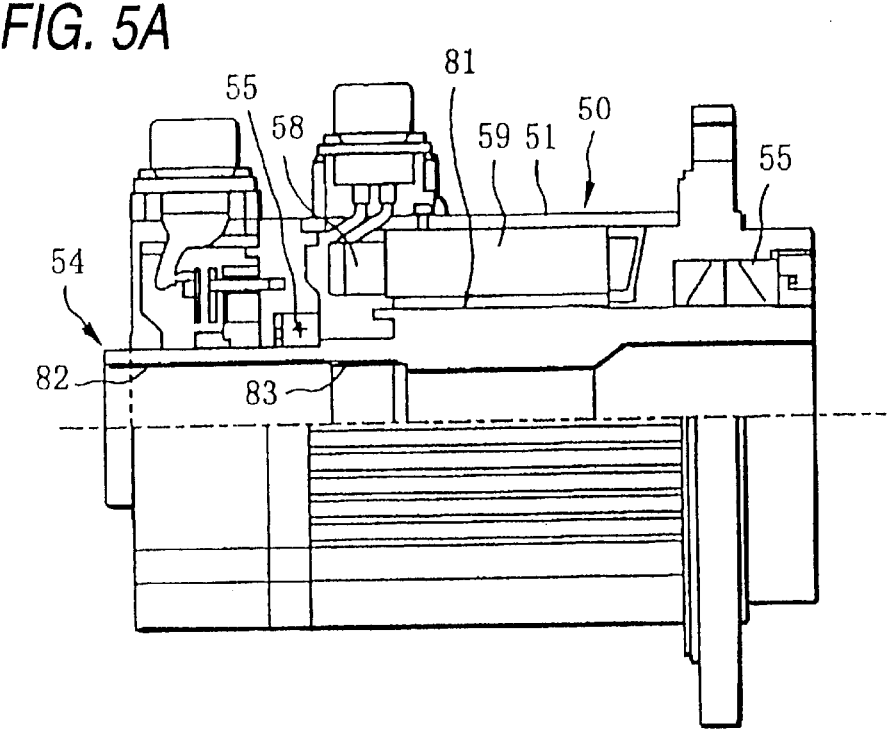
FIG. 5 is a view of an actuator illustrating a second embodiment of a vibrating apparatus and a simulator apparatus using the vibrating apparatus according to the present invention, FIG. 5A being a sectional view of a main part illustrating a rotator body, FIG. 5B being a sectional view of a main part showing a sleeve, FIG. 5C being a sectional view of a main part showing the engagement state of the rotator body and the sleeve, and FIG. 5D being a sectional view taken along the line a—a in FIG. 5C.

The rotator body 81 is a hollow shaft-shaped as shown in FIG. 5A, and is rotatably supported in a base 51 by means of a bearing 55 in the same manner as the rotator 54 according to the first embodiment. In the rotator body 81, a cylindrical sleeve fitting portion 82 in which a lower terminal potion 86 of the sleeve 85 can be fitted as shown in FIG. 5B is formed coaxially with an axis of the rotator body 81, and a threaded portion 83 is connected with the sleeve fitting portion 82.

Figure 5B:
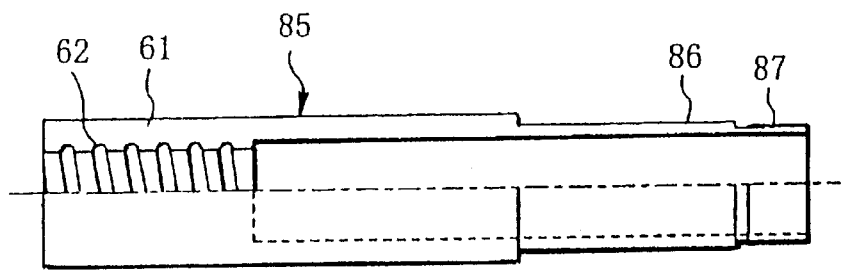

On the other hand, the sleeve 85 is hollow shaft-shaped as shown in FIG. 5B, and has the lower terminal portion 86 which has an outside diameter reduced and can be fitted in the sleeve fitting portion 82 formed on the rotator body 81. A threaded portion 87 is connected with the lower terminal portion 86 for being fitted in the threaded portion 83. On the other hand, a reduced diameter part 61 having an inside diameter reduced is formed on the tip of the sleeve 85 in the same manner as the tip of the rotator 54 according to the first embodiment, and a spiral ball groove 62 is formed on the curved inner surface of the reduced diameter part 61.

The lower terminal portion 86 of the sleeve 85 is fitted in the sleeve fitting portion 82 of the rotator body 81 to screw the respective threaded portions 83 and 87. Thus, the rotator body 81 and the sleeve 85 are coupled to each other.

Figures 5C, 5D:
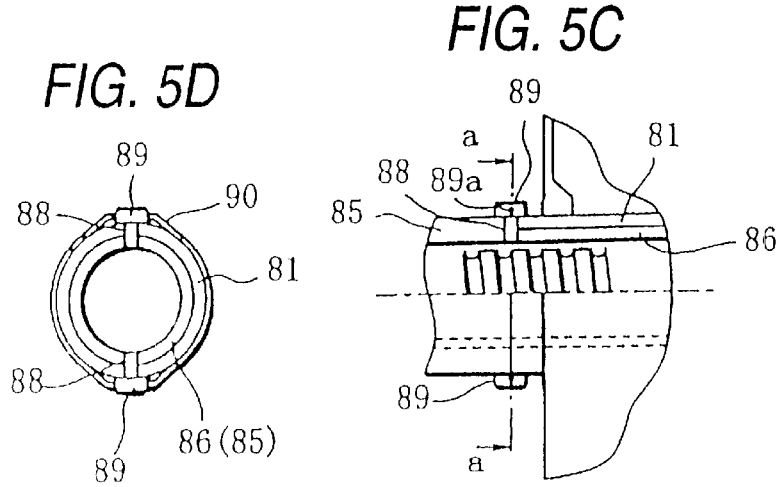
Figure 6A:
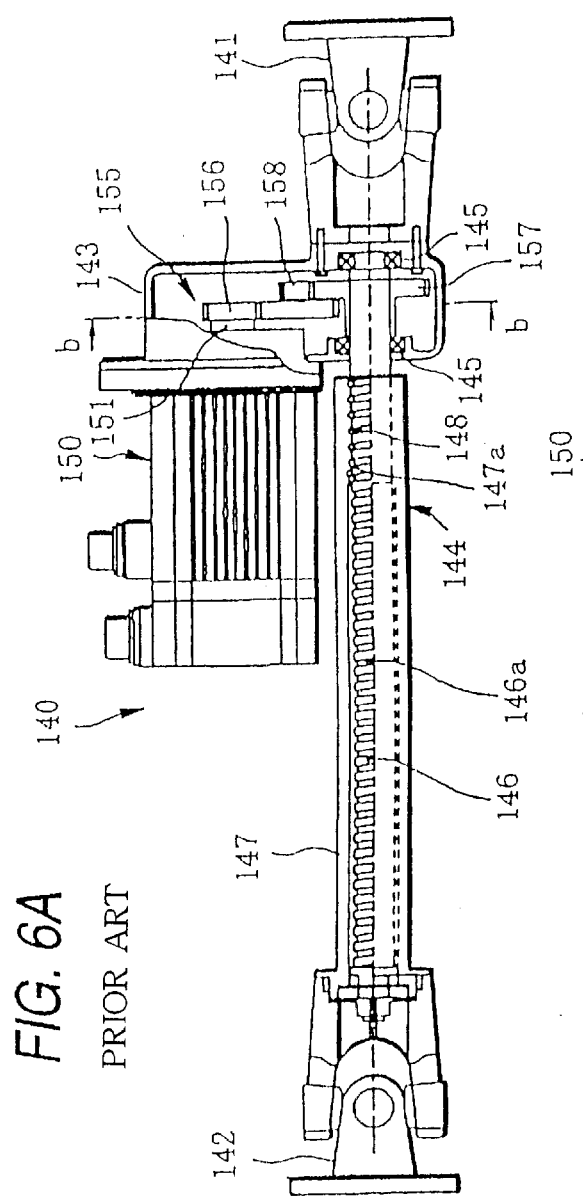
FIG. 6 is a view illustrating an actuator to be used for a vibrating apparatus according to the related art, FIG. 6A being a sectional view of a main part in a retracted state, FIG. 6B being a sectional view of a main part in an extended state, and FIG. 6C being a sectional view taken along the line b—b in FIG. 6A.
Figure 6B:
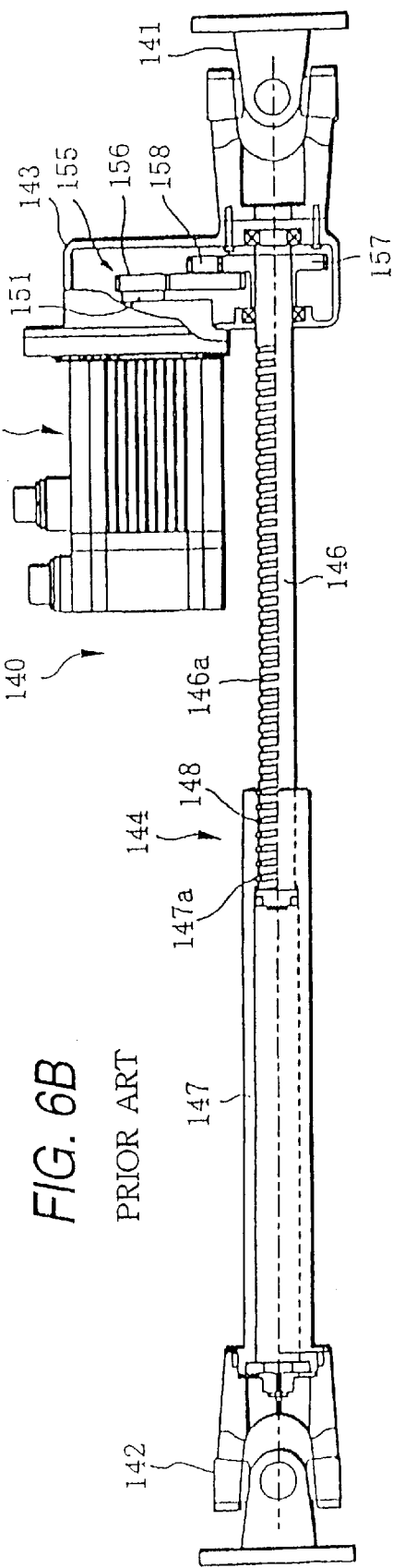
Figure 6C:
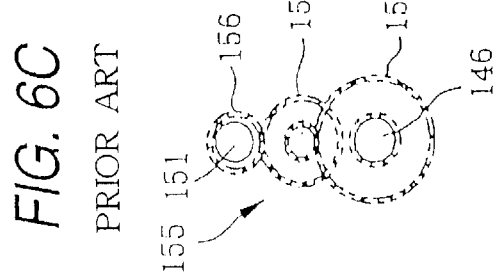
Figure 7A:
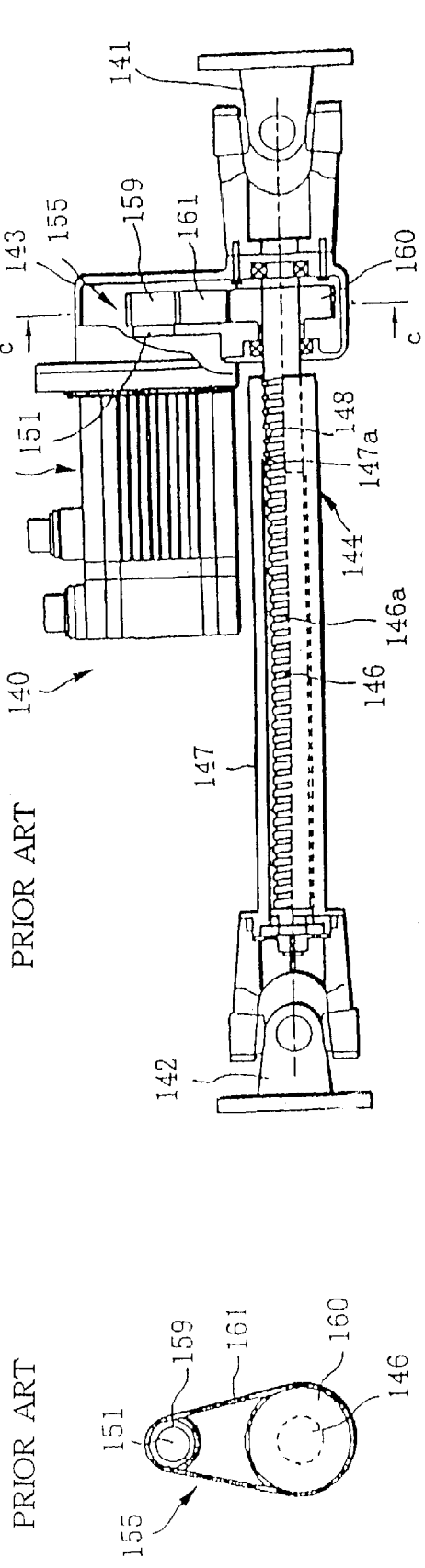
FIG. 7 is a view illustrating the actuator according to the related art, FIG. 7A being a sectional view of the main part in the retracted state, FIG. 7B being a sectional view of the main part in the extended state, and FIG. 7C being a sectional view taken along the line c—c in FIG. 7D.
Figure 7C:
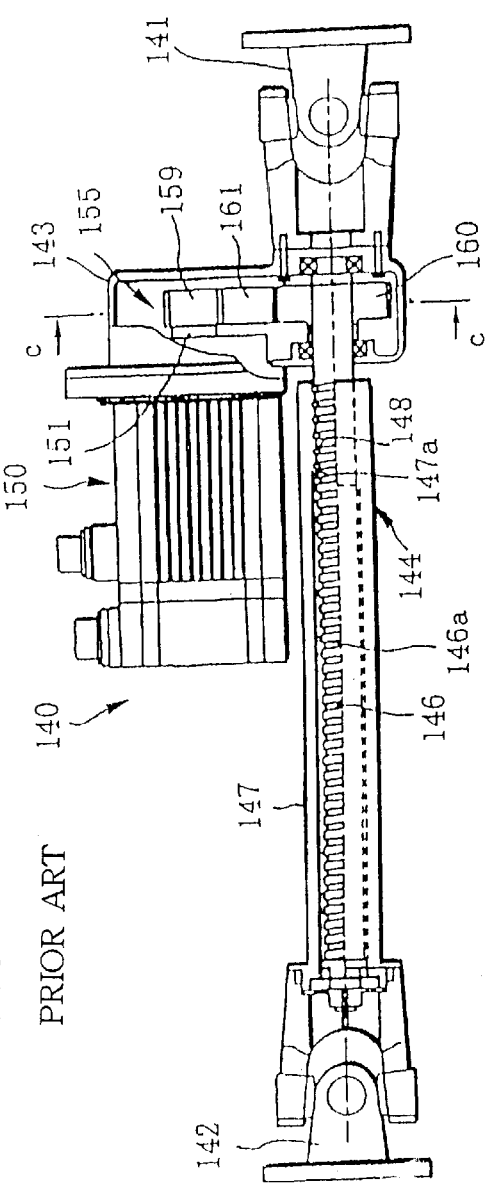
Figure 7B:
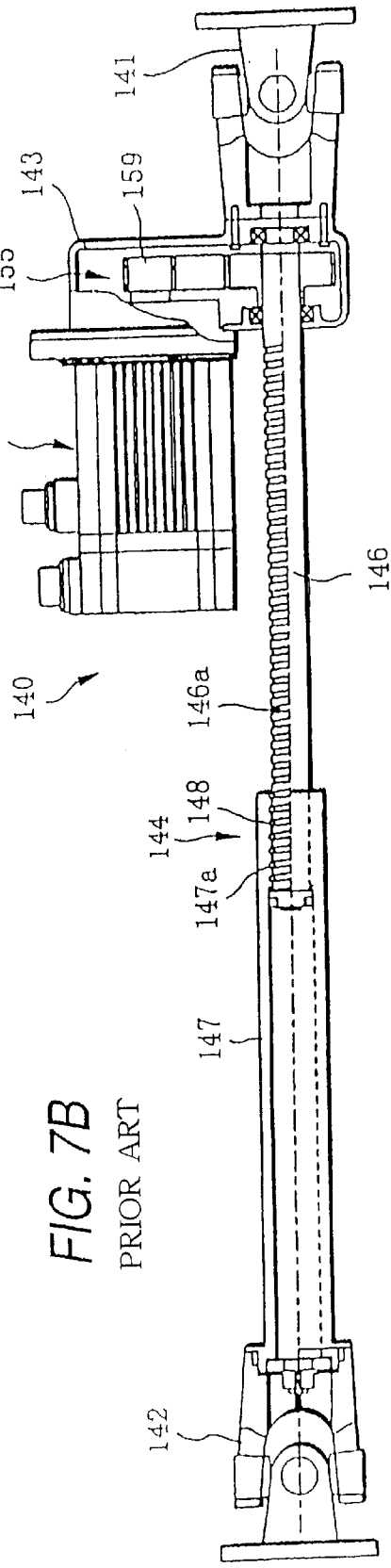

As shown in FIG. 5C and FIG. 5D taken along the line a—a of FIG. 5C, furthermore, a pair of through holes 88 are formed in a portion where the tip of the rotator body 81 and the sleeve 85 are joined together. A lock pin 89 is inserted into each of the through holes 88, thereby preventing the relative rotation of the rotator body 81 and the sleeve 85. In addition, a wire 90 is inserted into a through hole 89a formed on the head of the lock pin 81 to wind up around the outer peripheries of the rotator body 81 and the sleeve 85, thereby preventing the lock pin 89 from slipping off.

According to the present embodiment, the rotator 54 is divided into the rotator body 81 and the sleeve 85 in addition to the effects of the first embodiment. Therefore, the length of each component can be more reduced, workability can be more enhanced and manufacture can be performed more easily as compared with the rotator 54 according to the first embodiment.

In each of the above-mentioned embodiments, the electric motor 50 has been fixed to the base table 31 through the first universal joint 41, and the screw shaft 65 has been installed on the motion table 32 through the first universal joint 42. On the contrary, the electric motor 50 can be fixed to the motion table 32 through a universal joint and the screw shaft 65 can be installed on the base table 31 through a universal joint. While the case where the vibrating apparatus 30 is applied to the driving simulation device 1 has been taken as an example, it can be widely applied to a simulator apparatus such as a training system for the experience of simulation motion of cars and airplanes, a playing device or the like. The present invention is not restricted to the above-mentioned embodiments but can variously be changed without departing from the scope of the invention.

According to the above-mentioned electric motion device of the present invention, a plurality of actuators are provided between the base table and the motion table which are installed on installation parts, and each of the actuators is selectively extended and retracted to give motions to the moved portion supported on the motion table. In the electric motion device, each of the actuators provided between the base table and the motion table is formed by the screw shaft having the base end provided on one of the base table and the motion table through the universal joint, and the electric motor including the rotator which has the base fixed to the base table or the other motion table through the universal joint and which is hollow shaft-shaped for permitting the penetration of the screw shaft and is screwed to the screw shaft. Therefore, the screw shaft is caused to penetrate the inside of the rotator of the electric motor in the retracted state. Consequently, the height between the base table and the motion table can be reduced while keeping the range of the motion.

According to the simulator apparatus using the vibrating apparatus of the present invention, the height between the base table and the motion table in the vibrating apparatus can be reduced, and the height of the moved portion supported on the motion table is controlled. Consequently, projection from the projector to the screen can be easily performed without increasing the size of the building. Thus, a virtual reality can be given to the user of the simulator apparatus.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A vibrating apparatus having a base table, a motion table movable relative to the base table and a plurality of actuators having different orientations relative to each other being provided between the base table and the motion table, each of the actuators being selectively extended and retracted and operative to alter a spacing between the tables from a minimum spacing to a maximum spacing, the differing orientations of the actuators enabling the actuators collectively to establish a desired orientation of the motion table relative to the base table, each of the actuators comprising:

an electric motor having a base end fixed to one of the base table and the motion table through a first universal joint;

a rotator with a hollow shape provided in the electric motor to be rotated by the electric motor and having a projecting portion, the projecting portion being configured to project from an end face of the electric motor toward the other of the base table and the motion table so as to substantially minimize the minimum spacing within the constraint of a present value of a motion range of the motion table, and the rotator further comprising a spiral groove formed on an inner periphery of an end of the projecting portion; and a screw shaft having a spiral groove formed on an outer periphery thereof to be screwed to the spiral groove of the rotator and having an end connectable to the other of the base table and the motion table through a second universal joint;

wherein a length of the rotator with its projecting portion is approximately equal to a length of the screw shaft.

2. The vibrating apparatus according to claim 1, wherein the spiral groove formed on the outer periphery of the screw shaft and the spiral groove formed on the inner periphery of the rotator are spiral ball grooves meeting through balls fitted in the respective grooves.

3. The vibrating apparatus according to claim 1, wherein the electric motor is fixed to the base table through the first universal joint while the screw shaft is fixed to the motion table through the second universal joint.

4. A simulator apparatus having a simulated driving room, a vibrating apparatus supporting the simulated driving room and being selectively extendable and retractable to give motions to the simulated driving room, and a display system for displaying a virtual view for a driver in the simulated driving room, the vibrating apparatus comprising:

a base table;

a motion table movable relative to the base table; and a plurality of actuators having different orientations relative to each other being provided between the base table and the motion table, each of the actuators being selectively extendable and retractable, and being operative to alter a spacing between the tables from a minimum spacing to a maximum spacing, the differing orientations of the actuators enabling the actuators collectively to establish a desired orientation of the motion table relative to the base table, wherein each of the actuators comprises:

an electric motor having a base end fixed to one of the base table and the motion table through a first universal joint;

a rotator with a hollow shape provided in the electric motor to be rotated by the electric motor and having a projecting portion, the projecting portion being configured to project from an end face of the electric motor toward the other of the base table and the motion table so as to substantially minimize the minimum spacing while maintaining a motion range of the motion table, and the rotator further comprising a spiral groove formed on an inner periphery of an end of the projecting portion; and a screw shaft having a spiral groove formed on an outer periphery thereof to be screwed to the spiral groove of the rotator and having an end connectable to the other of the base table and the motion table through a second universal joint;

wherein a length of the rotator with its projecting portion is approximately equal to a length of the screw shaft.

* * * * *